Dec. 22, 1964  W. F. JACKSON ETAL  3,162,366
THERMALLY ACTUATED VALVE
Filed Oct. 31, 1961

INVENTORS.
WILBUR F. JACKSON
JOHN W. WRIGHT
BY Mead, Browne,
Schuyler, and Beveridge
ATTORNEYS.

United States Patent Office 3,162,366
Patented Dec. 22, 1964

3,162,366
THERMALLY ACTUATED VALVE
Wilbur F. Jackson, Rolling Hills, and John W. Wright, Long Beach, Calif., assignors to Robertshaw Controls Company, a corporation of Delaware
Filed Oct. 31, 1961, Ser. No. 149,030
3 Claims. (Cl. 236—48)

This invention relates to thermally actuated valves for controlling fluid flow in response to temperature variations, and particularly of the type adapted to control the flow of fluid fuel to a burner of a heating system or the like.

It is an object of this invention to actuate a valve between open and closed positions in response to temperature variations.

Another object is to actuate a valve to an open position with a snap-action in response to increases in temperature.

Another object is to snap open a normally closed valve by means of a mercury filled thermal element when heat applied to the mercury is sufficient to cause it to vaporize.

These and other objects are attained by the provision of the valve body having an inlet and an outlet with a valve element bias closed against the outlet to prevent flow through the body. Mounted in the body is a lever having a free end engageable with the valve, the lever having an actuating arm in engagement with an expansible power element in the valve body forming part of a mercury filled thermal element. Positioned remotely from the body is a temperature sensing element forming a part of the thermal element, the sensing element being mounted adjacent a pilot burner or the like. When the sensing element is heated, the mercury expands and when the heat applied is sufficient to vaporize the mercury, the rapid expansion caused by the vaporization expands the power element and actuates the lever to open the valve element.

Other objects and advantages of the invention will become apparent from the following description taken in connection with the accompanying drawing wherein.

Figure 1:
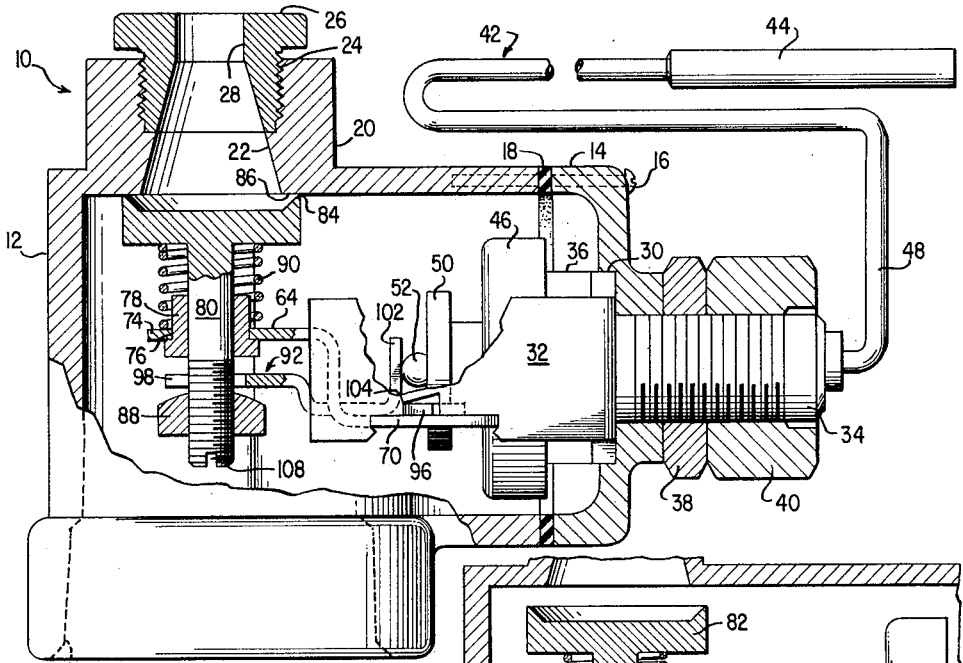
FIG. 1 is a side view of the valve with some of the parts shown in section.
Figure 2:
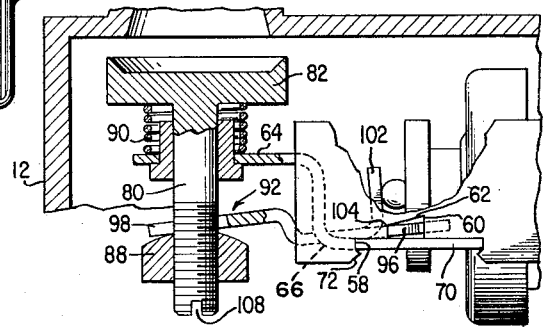
FIG. 2 is a partial sectional view of the valve with the valve shown actuated to the open position.
Figure 3:
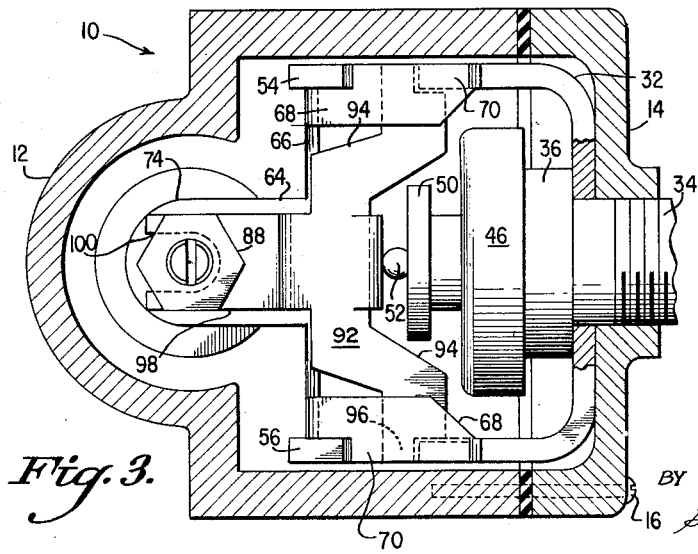
FIG. 3 is a partial sectional view of the valve as viewed from the inlet side.

In FIGS. 1 and 2, the valve body is indicated generally at 10 and comprises a main body 12 and a cover member 14 joined together by screws 16. Mounted between the matching surfaces of main body 12 and cover member 14 is a gasket 18 which is compressed between the members to form a fluid tight seal.

Main body 12 is provided with an inlet 18 and an outlet 20 for fluid flow through the body. Outlet 20 is provided with a tapered bore 22 and internal threads 24 for receiving an orifice plug 26. Plug 26 also is provided with a tapered bore extending to a cylindrical passage 28 of reduced diameter to provide the proper rate of flow through the outlet when gaseous fuel is being supplied to a burner or the like.

Formed in cover member 14 is a recess 30 for receiving a U-shaped support bracket 32. Support bracket 32 is held in place by a flange 36 of an enlarged threaded portion 34 of a thermal element 42. Portion 34 is secured to cover member 14 by locking nuts 38 and 40, which provide a metal to metal seal. If other than a metal to metal seal is desired, a sealant such as glyptal can be used; or suitable gaskets may be provided between the parts.

Threaded portion 34 forms part of a thermal element indicated generally at 42 which includes a sensing bulb 44 and an expansible power element 46 mounted in the body 10, with the interior of the power element 46 communicating with sensing bulb 44 through a capillary tube 48. Sensing bulb 44, capillary tube 48 and power element 46 form a close system which is filled with mercury so that as heat is applied at sensing bulb 44, the mercury will expand and cause expansion of power element 46. Mounted on power element 46 is a plunger element 50, and a steel ball 52 is mounted on the outer face of plunger 50 for a purpose to be described below.

Support bracket 32 includes a pair of laterally spaced parallel arms 54 and 56. Formed in each of arms 54 and 56 is a mounting notch 58 and a pivot notch 60 having an upper inclined edge 62. Pivot notch 60 is formed coincident with mounting notch 58.

Mounted on support bracket 32 is a guide bracket 64 having an arm member 66 and a pair of leg members 68 extending from each end of arm member 66. Mounting tabs 70 are formed on each of legs members 68 and are positioned in mounting notches 58 and staked thereto as indicated at 72. Projecting from arm member 66 is a guide member 74 which is formed with an opening 76. Press fitted into opening 76 is a guide bushing 78.

Slidably received in guide bushing 78 is the stem 80 of a disc valve 82 having a rim 84 for engagement with a valve seat portion 86 adjacent outlet 22. To provide a seal between valve 82 and valve seat area 86, the mating areas of the valve and valve seat area may be machined smooth or valve face material such as silicone may be employed to provide a seal between the valve and valve seat.

The end of valve stem 80 is threaded to receive an adjusting nut 88 which forms an abutment on the valve stem for a purpose to be described. Mounted between valve element 82 and guide bracket 64 is a helical spring 90 for biasing valve 82 to the closed position against seat 86.

Pivotally mounted in support bracket 32 is a lever indicated generally at 92. Lever 92 includes a pair of laterally extending arms 94, each arm 94 being provided with a pivot tab 96 at the ends thereof. Pivot tabs 96 overlie legs 68 of guide bracket 64 and are received in pivot notches 60. Projecting centrally from the portion between arms 94 of lever 92 is a lever arm 98 having a slot 100 formed in the end thereof through which valve stem 80 extends. Projecting vertically from the portion between arm members 94 is an actuating arm 102, which as illustrated in FIGS. 1 and 2 engages steel ball 52 on power element 46. Movement of power element 46 causes lever 92 to pivot about corner 104 of pivot notch 60 formed by the slanted or inclined edge 62. Pivotal movement of lever 92, as illustrated in FIG. 2, causes the free end adjacent slot 100 of lever arm 98 to engage adjusting nut 88 and move valve element 82 to the open position against the bias of spring 90. For adjusting abutment 88 relative to the valve, a screwdriver slot 108 may be provided in the end of valve stem 80.

In operation, sensing bulb 44 may be positioned adjacent a pilot burner (not shown) which is ignited and extinguished in response to temperature variations of a space to be heated. When the pilot burner (not shown) is ignited, the flame will impinge on sensing element 44 and heat the mercury in the thermal element 42 causing it to expand. When heat is applied to sensing bulb 44, the mercury will initially expand at a relatively slow rate, while in the liquid state, causing power element 46 to expand moving plunger 50 and steel ball 52 to the left, as viewed in FIG. 1. When sufficient heat has been applied to sensing element 44 to cause the mercury to vaporize, there is a rapid expansion of the mercury vapor which, acting through power element 46 causes a rapid movement to the left of plunger element 50. Therefore, adjusting nut 88 is initially positioned so that there is a space between lever arm 98 and adjusting nut 88, and the initial heating of the mercury causes lever arm 98 to move into engagement with abutment 88. Further heating of the mercury will cause it to vaporize which is accomplished by rapid expansion of power element 46 causing valve element 82 to be opened with a snap-action to the position illustrated in FIG. 2.

To illustrate the above operation, the valve may be designed so that the lever ratio between actuating arm 102 and arm 98 of lever 94 is approximately 6 to 1. When the mercury in the sensing bulb 44 is heated to approximately 900° F., plunger element 50 moves approximately .010 inch. Approximately .008 inch of this movement occurs between 700° F. and 900° F. where the movement is extremely rapid as the mercury liquid changes to mercury vapor. This rapid expansion is preceded by relatively slower expansion of approximately .002 inch, while the mercury is in the liquid state before vaporization. Thus, adjusting nut 88 is positioned so that a movement of .002 inch of plunger element 50 will cause lever arm 98 to move into engagement with abutment 88. Since further heating will cause the mercury to reach its heat of vaporization, the valve will open with a snap-action to provide approximately .048 inch valve opening. Snap-closing also occurs as the mercury changes from its vapor state to a liquid state upon cooling of sensing bulb 44. The above figures are for illustration purposes only to describe the functioning of the valve and are not to be construed in a limiting sense.

The above described construction is simple to assemble requiring a minimum number of operations. The valve element 82, spring 90, guide bracket 64, lever 92 and thermal element 42 are first assembled in support bracket 32 after which the threaded portion 34 of thermal element 42 is inserted through a circular opening in cover member 14. Main body 12 is then joined to cover member 14 to complete the assembly.

While a specific example of the invention has been described for purposes of illustration, it will be understood by those skilled in the art that various modifications can be made without departing from the scope of the invention as defined by the appended claims.

What we claim is:

1. A thermally responsive valve comprising a body having a passage for fluid flow, a thermal element including an expansible power element mounted in said body and a remotely positioned sensing element, a bracket mounted in said body, at least one notch formed in said bracket having an upper inclined edge forming a pivot corner, guide means fixedly supported in the notch, a normally closed valve element slidably mounted in the guide means for controlling flow in said passage, a lever having a pivot tab positioned in said notch to support the lever for pivotal movement about the pivot corner, one end of said lever being operatively engaged with said expansible power element and the other end engageable with said valve element to actuate the valve element in response to expansion and contraction of the power element.

2. A thermally responsive valve as defined in claim 1 in which said thermal element is filled with mercury, and said one end of said lever is spaced from said valve element and movable by said power element to engage said valve element as the mercury expands in the liquid state in response to heat applied at said sensing element, and further movable to actuate said valve element to its open position upon further expansion of said power element when the mercury vaporizes.

3. A thermally responsive valve comprising a body having an inlet and an outlet and a passage therebetween for fluid flow, a thermal element including an expansible power element mounted in said body and a remotely positioned sensing element, a bracket mounted in said body having a pair of spaced, parallel arms, a mounting notch formed in each of said parallel arms, a pivot notch coincident with each mounting notch having an inclined edge forming a pivot corner, a guide bracket having a pair of laterally extending arms fixedly mounted in said mounting notches, a normally closed valve in said passage having a stem slidable in said guide bracket, a lever having a pair of laterally extending pivot tabs, said pivot tabs being positioned in said pivot notches overlying the arms of said guide bracket for pivotal movement about said pivot corner, a free end of said lever arranged to engage said stem and move said valve to the open position permitting fluid flow through the passage, and an actuating arm on said lever in engagement with said power element to be moved by expansion of said power element upon an increase in temperature at said sensing element to actuate said valve to its open position.

References Cited in the file of this patent

UNITED STATES PATENTS

| | | |
|---|---|---|
| 1,120,707 | Froehlich | Dec. 15, 1914 |
| 1,307,450 | Morton | June 24, 1919 |
| 1,796,124 | Seely | Mar. 10, 1931 |
| 2,067,629 | Flagg | Jan. 12, 1937 |
| 2,099,643 | Werring | Nov. 16, 1937 |
| 2,112,363 | Gotthardt | Mar. 29, 1938 |
| 2,558,651 | Ives | June 26, 1951 |
| 2,582,419 | Dillman et al. | Jan. 15, 1952 |
| 2,906,460 | Daly | Sept. 29, 1959 |

FOREIGN PATENTS

| | | |
|---|---|---|
| 233,819 | Australia | Dec. 24, 1959 |